United States Patent
Greenwald

(10) Patent No.: US 8,226,847 B1
(45) Date of Patent: Jul. 24, 2012

(54) COMPOSITION FOR MELTING ICE AND SNOW

(76) Inventor: Steven Greenwald, Huntingdon Valley, PA (US)

( * ) Notice: Subject to any disclaimer, the term of this patent is extended or adjusted under 35 U.S.C. 154(b) by 0 days.

(21) Appl. No.: 13/074,337

(22) Filed: Mar. 29, 2011

(51) Int. Cl.
*C09K 3/18* (2006.01)

(52) U.S. Cl. .............................. 252/70; 106/13; 428/403

(58) Field of Classification Search ................ 106/17; 252/70; 428/403
See application file for complete search history.

(56) References Cited

U.S. PATENT DOCUMENTS

| | | | | |
|---|---|---|---|---|
| 4,512,907 A | * | 4/1985 | McConnell | 252/70 |
| 4,597,884 A | | 7/1986 | Greenwald | |
| 5,482,639 A | * | 1/1996 | Archer et al. | 252/70 |
| 5,683,619 A | * | 11/1997 | Ossian et al. | 252/70 |
| 6,039,890 A | * | 3/2000 | Ossian et al. | 252/70 |
| 7,264,746 B2 | * | 9/2007 | Sands et al. | 252/70 |

OTHER PUBLICATIONS

AGROTAIN International LLC, Agrotain Material Safety Data Sheet.
AGROTAIN information sheet.
GILGAMES, specifications for prilled urea and granular urea.

\* cited by examiner

*Primary Examiner* — Anthony J Green
(74) *Attorney, Agent, or Firm* — William H. Eilberg

(57) ABSTRACT

A composition for melting ice and snow includes granular particles, preferably made of urea, the particles being coated by a mixture of an antifreeze composition and a nitrate inhibitor. The antifreeze and nitrate inhibitor are provided in liquid form, and the liquid mixture is sprayed or otherwise coated onto the particles. The composition provides an improved ice-melting material while minimizing environmental damage due to leaching of nitrates into ground water reservoirs.

4 Claims, No Drawings

COMPOSITION FOR MELTING ICE AND SNOW

BACKGROUND OF THE INVENTION

The present invention comprises a composition for melting ice and snow, and in particular provides a composition which includes a solid substrate coated with a liquid-phase melting compound.

An example of an ice-melting composition is provided in U.S. Pat. No. 4,597,884, the disclosure of which is incorporated by reference herein. The present invention comprises an improvement over the composition described in the above-cited patent.

As explained more fully in the above-cited patent, a major consideration in selecting a melting material is the corrosive effect the melting material will have on the surrounding environment. The cited patent uses urea, particularly prill urea particles, as the preferred melting material.

In the cited patent, it is recognized that urea still has disadvantages. Among these are the fact that urea is slow-acting, and is prone to being blown away before ice melting begins. It is also susceptible to refreezing. Moreover, when provided in the form of spherical particles, the degree of surface contact between the particles and the ice to be melted is limited, thereby limiting the effectiveness of the material for melting ice.

The cited patent therefore discloses urea particles which have been coated with a material provided in a liquid phase, wherein the liquid material helps to overcome the disadvantages of the urea. The preferred coating material is an antifreeze composition, which may be ethylene glycol or propylene glycol, and which may also include corrosion-inhibitors and wetting agents. In another embodiment, the coating material could be an aircraft deicing fluid.

The composition described in the above-cited patent works well, but has one environmental disadvantage, namely the production of nitrates and pollution of ground water sources. The urea itself is not a pollutant. However, when temperatures begin to rise in early spring, and the once-frozen ground becomes thawed, microbes become active, and secrete an enzyme that breaks down the urea into nitrates. These nitrates can migrate through the soil relatively quickly, and can eventually reach ground water sources. If sufficient quantities of nitrates reach the ground water, the result is a major pollution problem.

The present invention therefore provides an ice melting composition which has the advantages of the composition described in the above-cited patent, but which also reduces or eliminates the environmental hazard described above.

SUMMARY OF THE INVENTION

The present invention comprises an ice-melting composition which includes a substrate formed of an ice-melting material, the substrate being provided in the form of granular particles. The substrate is coated with a liquid mixture comprising an antifreeze composition and a nitrate inhibitor.

In the preferred embodiment, the substrate is formed of granular urea particles, and the antifreeze composition is a material selected from the glycol family, such as ethylene glycol or propylene glycol, or aircraft deicing compositions. The nitrate inhibitor is preferably AGROTAIN DC.

In the composition of the present invention, the substrate accounts for the major portion (at least about 95% by weight). The antifreeze material is less than about 5%, and the nitrate inhibitor is present in an amount which is less than 3%. The antifreeze material and nitrate inhibitor are provided in liquid form, and are mixed together before being applied as a coating to the granular substrate material. The coating is applied in an amount such that the coated substrate still feels relatively dry.

The invention therefore has the primary object of providing an ice-melting composition.

The invention has the further object of providing an ice-melting composition having a nitrate inhibitor.

The invention has the further object of providing an ice-melting composition which minimizes or reduces environmental damage caused by leaching of nitrates.

The invention has the further object of providing an ice-melting composition which is both environmentally safe and effective in melting ice and snow.

The reader skilled in the art will recognize other objects and advantages of the present invention, from a reading of the following detailed description of the invention, and the appended claims.

DETAILED DESCRIPTION OF THE INVENTION

The present invention includes a substrate made of an ice-melting material such as urea, coated with a liquid. The liquid coating includes both an antifreeze composition, such as a glycol, and a nitrate inhibitor. The nitrate inhibitor is provided in a liquid form, and is mixed with the antifreeze composition, which is also a liquid. The combined liquid is then coated onto the ice-melting substrate, using any of the methods described in the above-cited U.S. Pat. No. 4,597,884.

A nitrate inhibitor blocks the formation of the enzyme urease which is produced by microbial action on the urea. If formed, the urease would break down the urea into nitrates. In large quantities, such nitrates are very mobile, and will flow through the soil towards ground water reservoirs. Although the urea itself is not a pollutant, the nitrates pose an environmental problem.

The rapid flow of nitrates is known as "slug" flow. A slug flow is sufficiently large that the ground water cannot dilute the nitrate concentration to a point where the nitrate would be rendered harmless. The use of a nitrate inhibitor changes a slug flow into a trickle. That is, the presence of the nitrate inhibitor means that the nitrates that form are produced over a longer time period. The slow release of nitrates allows the plants in the surrounding area to use the nitrates as a nutrient. There will still be a relatively small amount of nitrates that are not used by surrounding vegetation, but the quantity would be so small that it would be diluted, in ground water, to a harmless level.

Without a nitrate inhibitor, the nitrates would be formed quickly. The resulting slug flow would be so large and rapid that surrounding plants would not be able to use all of the nitrates, so there would be a large quantity of nitrates that would be added to the ground water as a major pollutant.

The preferred nitrate inhibitor is a material sold under the trademark AGROTAIN DC, and which is commercially available from Agrotain International LLC, of St. Louis, Mo. The AGROTAIN DC material includes N-(n-butyl)thiophosphoric triamide (NBPT). Other nitrate inhibitors could be used instead of AGROTAIN DC.

The nitrate inhibitor is preferably provided as a liquid, and is mixed together with the liquid antifreeze composition, such as glycol, which is described in U.S. Pat. No. 4,597,884.

Examples of the composition of the present invention are as follows.

Example 1

In this Example, granular carbonyl diamide (urea) particles are coated with a mixture of glycol and AGROTAIN DC nitrate inhibitor. The carbonyl diamide is provided in an amount which is about 98.5% (by weight), the glycol is about 1.25% (by weight), and the nitrate inhibitor is about 0.25% (by weight). The urea particles are coated with the mixture in an amount which is just enough so that the particles still feel relatively dry.

Example 2

In this Example, carbonyl diamide is provided in an amount which is 99.0% (by weight), glycol is about 0.75% (by weight), and the nitrate inhibitor is about 0.25% (by weight).

Example 3

In this Example, carbonyl diamide is provided in an amount which is 99.50% (by weight), glycol is about 0.375% (by weight), and the nitrate inhibitor is about 0.125% (by weight).

In the more general case, the urea (carbonyl diamide) should be provided in a percentage (by weight) which is greater than about 95% of the total composition. The glycol, or other antifreeze composition, should be provided in an amount which is less than about 5%. The balance should be the nitrate inhibitor, which in any case should be less than about 3% by weight.

In the above-cited U.S. Pat. No. 4,597,884, the urea was provided in the form of prilled particles. It has been found that granular particles are even more preferable. As used in the art, the term "granular urea" indicates that the particles are somewhat larger, on average, than the particles in the prill form, and are not quite as uniform as a prill. In particular, the prilled urea typically contains particles ranging in size from about 1-4 mm, and a granular urea contains particles in a range of about 2-4 mm. In the cases of both prilled and granular, the urea is a flowable material. It has been found that the granular form is easier to control during the process of making the ice-melting composition, because the granular particles are less likely to dissolve while being coated. The granular urea used in the present invention can be obtained from Gilgames Pty Ltd, of New South Wales, Australia.

As noted in U.S. Pat. No. 4,597,884, while the preferred substrate material is urea, other ice-melting materials could be used instead, including calcium chloride, sodium chloride (rock salt), and CMA (calcium-magnesium-acetate). The antifreeze composition is preferably selected from such materials as glycol, especially ethylene glycol and propylene glycol, and aircraft deicing fluids, such as UCAR produced by Union Carbide. It is preferred that the glycol contain corrosion inhibitors and wetting agents in order to enhance the melting and non-corrosive characteristics of the product. This type of glycol preparation is known as an inhibited glycol, and the commercially available UCAR has these various inhibitors and wetting agents as part of its composition.

The combined liquid phase coating, which includes both the antifreeze composition and the nitrate inhibitor, is applied to the substrate by any conventional method, such as mechanically mixing together the substrate and the combined liquid in a vessel, spraying the liquid onto the substrate, or by coating the substrate in a fluidized bed or by vapor deposition. The antifreeze composition may be diluted, as needed, in the same manner described in U.S. Pat. No. 4,597,884.

The nitrate inhibitor AGROTAIN is available in both a dry and a liquid form. Although the preferred embodiment uses AGROTAIN in the liquid form, it is possible to use the dry form, which can be mixed with the liquid glycol to form a material that is still sufficiently flowable that it can be coated onto the urea or other substrate. The present invention should thus not be deemed limited by the form of the nitrate inhibitor.

The invention can be modified in various ways. The substrate is not limited to urea particles, but other ice-melting compositions could be used instead. Various antifreeze compositions may be substituted, as explained above. Different nitrate inhibitors could be used instead of AGROTAIN DC. These and other modifications, which will be apparent to the reader skilled in the art, should be considered within the spirit and scope of the following claims.

What is claimed is:

1. A composition comprising an ice-melting substance provided in a form of granular urea particles, the particles being coated by a liquid material, the liquid material comprising a mixture of an antifreeze material comprising a glycol and a nitrate inhibitor comprising N-(n-butyl)thiophosphoric triamide (NBPT).

2. The composition of claim 1, wherein the coating also comprises corrosion inhibitors and wetting agents.

3. An ice-melting composition comprising a plurality of granular urea particles, the particles being coated with a mixture comprising a glycol and a nitrate inhibitor comprising N-(n-butyl)thiophosphoric triamide (NBPT), wherein the particles comprise at least about 95%, by weight, of the composition, and wherein the glycol comprises less than 5% of the composition.

4. The composition of claim 3, wherein the nitrate inhibitor is present in an amount which is less than that of the glycol.

\* \* \* \* \*